United States Patent
Fix et al.

(10) Patent No.: US 9,513,758 B2
(45) Date of Patent: Dec. 6, 2016

(54) ELECTRICAL FUNCTIONAL LAYER CONSTRUCTION, PRODUCTION METHOD AND USE THEREOF

(75) Inventors: Walter Fix, Fürth (DE); Alexander Knobloch, Paderborn (DE); Andreas Ullmann, Zirndorf (DE); Jasmin Wörle, Nürnberg (DE)

(73) Assignee: PolyIC GmbH & Co. KG, Furth (DE)

( * ) Notice: Subject to any disclaimer, the term of this patent is extended or adjusted under 35 U.S.C. 154(b) by 981 days.

(21) Appl. No.: 13/259,274

(22) PCT Filed: Mar. 26, 2010

(86) PCT No.: PCT/EP2010/001917
§ 371 (c)(1),
(2), (4) Date: Apr. 19, 2012

(87) PCT Pub. No.: WO2010/108692
PCT Pub. Date: Sep. 30, 2010

(65) Prior Publication Data
US 2012/0193130 A1   Aug. 2, 2012

(30) Foreign Application Priority Data
Mar. 27, 2009   (DE) .................. 10 2009 014 757

(51) Int. Cl.
*H05K 1/00* (2006.01)
*G06F 3/045* (2006.01)
*G06F 3/047* (2006.01)

(52) U.S. Cl.
CPC .............. *G06F 3/045* (2013.01); *G06F 3/047* (2013.01)

(58) Field of Classification Search
CPC ...... H05K 1/0296; H05K 1/03; H05K 1/0306; H05K 1/0313; H05K 1/032; H05K 1/09; H05K 1/11; H05K 3/40; H05K 7/02; H05K 7/06; H05K 1/18; H05K 3/30
USPC .......................... 174/250, 251, 253, 255, 257
See application file for complete search history.

(56) References Cited

U.S. PATENT DOCUMENTS

| | | | |
|---|---|---|---|
| 4,745,240 A | 5/1988 | Furukawa et al. | |
| 6,333,736 B1 | 12/2001 | Sandbach | |
| 6,590,622 B1 | 7/2003 | Nakanishi et al. | |
| 2004/0012570 A1 | 1/2004 | Cross et al. | |
| 2004/0095336 A1 | 5/2004 | Hong et al. | |
| 2007/0063983 A1 | 3/2007 | Huang et al. | |
| 2008/0286447 A1* | 11/2008 | Alden et al. | 427/108 |
| 2009/0050876 A1* | 2/2009 | Marks et al. | 257/24 |

FOREIGN PATENT DOCUMENTS

| | | |
|---|---|---|
| DE | 3624656 A1 | 4/1987 |
| EP | 1947701 A2 | 7/2008 |
| JP | 63-247820 | 10/1988 |

(Continued)

*Primary Examiner* — Tremesha S Willis
(74) *Attorney, Agent, or Firm* — William Squire

(57) ABSTRACT

Transparent electrically conductive functional layer, production process and use thereof.

The invention concerns a transparent electrically conductive functional layer, in particular a laminate body. The invention makes it possible for the first time to produce thin conductive functional layers for use in resistive touch screens, for example in a printing process. By way of example with a coverage of 5% and adequate conductivity the functional layer still works at 95% transparent for the human eye.

16 Claims, 8 Drawing Sheets

(56) References Cited

FOREIGN PATENT DOCUMENTS

| | | |
|---|---|---|
| JP | H02-001263 | 1/1990 |
| JP | 10-301716 | 11/1998 |
| JP | H10-312715 | 11/1998 |
| JP | 2004145761 A | 5/2004 |
| JP | 2004-192093 A | 7/2004 |
| RU | 2029353 | 2/1995 |
| RU | 61899 U1 | 3/2007 |
| WO | WO 2008/020141 A1 | 2/2008 |
| WO | 2009038277 A1 | 3/2009 |

* cited by examiner

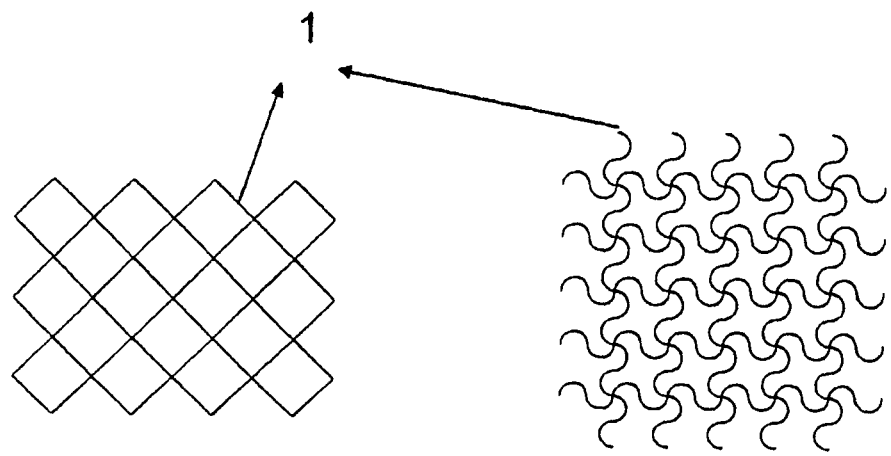
FIGURE 1 a
FIGURE 1 b
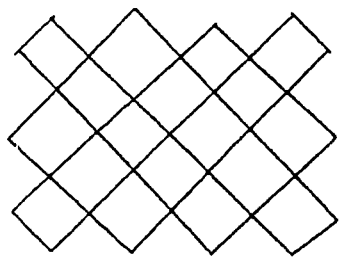
FIGURE 2 a
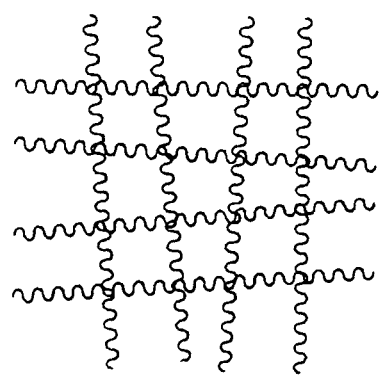
FIGURE 2 b

ELECTRICAL FUNCTIONAL LAYER CONSTRUCTION, PRODUCTION METHOD AND USE THEREOF

The invention concerns an electrical functional layer, in particular a laminate body, and processes for the production thereof and uses thereof.

The production of resistive touch screens controlled by sensor means requires transparent conductive and possibly also structured functional layers which hitherto are made from transparent ITO (indium tin oxide). In the case of resistive touch screens two oppositely disposed conductive layers are brought into contact by pressing (contact at a given location) and the pressure point is identified by way of determining resistance. As those touch screens are always linked to a stored imagery (display and/or graphics), a high degree of translucency and adequate conductivity for determining the pressure point are required. Hitherto those laminate bodies are made from ITO, for example on a plastic film.

A disadvantage with the known electrical functional layers of ITO is that the material is very expensive, in which respect either transparency or electrical conductivity can be optimised. In addition resistive touch screens with the conventional ITO layers can implement only a 'one-touch' function, that is to say it is only ever possible to detect a x- and y-co-ordinate because the control unit can only ever process one signal or position.

Therefore the object of the present invention is to provide an electrical functional layer which has a higher degree of transparency and at the same time a higher level of electrical conductivity and which overcomes the disadvantages of the state of the art, as well as production processes for same, which are inexpensive and are suitable for mass production.

That object is attained by the subject-matter of the present application as disclosed by the description, the Figures and the claims.

Accordingly the subject-matter of the present invention is an electrical functional layer in which conductive, non-transparent tracks of a thickness in the range of 2 nm to 5 µm are arranged parallel to the surface of a transparent carrier, forming a pattern, such that embodied in the pattern is a conductor track spacing which ensures areal conductivity of the electrical functional layer with at the same time transparency for the human eye.

In addition the subject-matter of the invention is a process for the production of a transparent and electrically conductive functional layer, wherein electrically conductive non-transparent tracks are produced on a transparent substrate by structured application, coating and subsequent structuring, embossing and/or by printing.

Finally the subject-matter of the invention is the use of a functional layer according to the invention in a resistive touch screen.

In an advantageous embodiment of the invention the width of the non-transparent conductive tracks is in the range of between 1 µm and 40 µm, preferably between 5 and 25 µm.

The term 'conductive' is used here generally to denote an electrically conductive substance. The conductive tracks are therefore in the present case always at least electrically conductive tracks.

In an embodiment the pattern is segmented on the functional layer, wherein the width of a segment is for example in the range of 500 µm to 15 mm, preferably 1 mm to 3 mm.

In an advantageous embodiment of the invention the conductor track spacing is in the range of 10 µM to 5 mm, preferably 300 µm to 1 mm. If the conductor track spacing is in those ranges, on the one hand conspicuous diffraction effects are avoided and on the other hand the pattern regions are individually not visible as the subdivision is below the resolution limit of the human eye viewing without aids.

The segment spacing is in the range of 10 µm to 2 mm, preferably 100 µm to 1 mm.

The thickness of the conductive tracks which could be seen on the transparent carrier layer as a raised portion with a sufficiently high level of resolution in cross-section or as a side view is in the range of 2 nm-5, preferably it is in the range of 3 nm to 5 µm, particularly preferably between 40 nm and 1 µm.

In a preferred embodiment the material of the conductive track is for example metal, preferably copper or silver. It is not necessarily the case that all conductive tracks are of the same material, thus in a pattern formation a layer of conductive tracks can be of a different material from the layer thereabove which with the lower layer forms a pattern.

In a preferred embodiment the pattern of conductive tracks is connected by a layer which is transparent and generally very thin, under some circumstances also being only poorly conductive but in return throughout. In that respect the pattern of conductive tracks can be embedded in the layer or the layer connects only the conductive tracks in electrically conducting relationship in such a way as to result in a continuous conductive area. That layer is of a transparent, electrically conductive material, for example indium tin oxide (ITO), another metal oxide such as zinc oxide or an organically based material such as PEDOT (in any doping levels), a material filled with nanoparticles or further materials which are transparent and electrically conductive. That layer is preferably very thin, for example the thickness of the layer can be in the range of 5 to 500 nm, preferably 10 to 100 nm.

A further embodiment according to the invention is an electrical functional layer having two, preferably mutually opposite, connecting electrodes, in which at least two conductive tracks are arranged parallel to the surface of a transparent carrier and between the connecting electrodes in such a way that they connect the connecting electrodes together in such a fashion that the pattern produced by the conductive tracks has a conductor track spacing which ensure conductivity of the electrical functional layer with at the same time transparency for the human eye.

The transparent carrier is preferred but not restricted to a transparent film, in particular a flexible film and quite preferably a plastic film, for example a film of a polyolefin such as polyethylene (PE), polypropylene (PP), polyvinyl chloride (PVC), polystyrene (PS), polyester (PE) and/or polycarbonate (PC).

Flexible carriers have the advantage that they can be printed upon for example in a continuous production process, for example using a roll-to-roll process. The transparent carrier can also be an electrically conductive functional layer according to the invention or also another transparent and conductive layer, for example of ITO, another metal oxide such as zinc oxide, or an organically based material such as PEDOT (in any doping levels), a material filled with nanoparticles or further materials which are transparent and electrically conductive.

The conductive tracks can be of any electrically conductive material or a mixture of a plurality of materials. For example the tracks are of metal, in particular silver, copper, gold, aluminium etc and/or an alloy or a conductive paste, as well as other conductive substance, for example an organic compound with mobile charge carriers such as polyaniline, polythiophene and others. It will be appreciated that all materials can occur in doped form. In that respect it is to be mentioned once again that, in formation of the pattern, the conductive tracks can be of various materials.

The connecting electrodes can also be made up from all materials usual for electrodes. Connecting electrodes of copper and/or silver are particularly preferred.

The connecting electrodes and/or the conductive tracks can also be provided with a contact booster serving for better signal transmission. That can be for example of conductive silver or carbon black.

The conductive tracks are preferably applied in high-resolution patterns on the transparent carrier. The conductive tracks are generally not or only semitransparent so that the transparency which those structures on the transparent carrier have for the human eye is achieved by the high-resolution structures and not by transparency of the conductive material itself.

In that respect, particular value is placed on avoiding moiré effects which possibly occur, for example when storing a display. The term moiré effect is used to denote the optical phenomenon in which non-existent lines appear by the superimpositioning of a plurality of patterns. It occurs in particular with identical patterns and/or with periodically repeating patterns. In touch screen applications the moiré effect can occur due to superimpositioning of the display pixel matrix with the superposed conductive pattern according to the invention. For that reason the production of parallel straight lines in structuring of the conductive tracks is preferably avoided.

Thus when covering the transparent carrier with conductive conductor tracks, patterns are selected which do not involve any periodicity so that superimpositionings with a moiré effect are excluded or at least greatly restricted.

In addition the unwanted moiré effect is also countered in that, in an advantageous embodiment, straight lines are eliminated and corrugated and/or jagged lines with for example an aperiodic or random structure sequence are selected.

Preferred embodiments involve forming patterns with for example:
  parallel conductive tracks,
  non-parallel conductive tracks for avoiding moiré, and
  wavy, jagged conductive tracks, as shown in the Figures.

Various methods can be used to produce the conductive tracks, for example the tracks can be produced by printing, embossing, offset or the like.

In addition structuring can also be produced by printing with a conductive paste containing for example metal and/or an alloy and/or carbon in an electrically conductive modification. Organic conductive materials can also be applied by simple printing in suitable tracks.

In an embodiment of the invention the transparent electrically conductive functional layer is used for the production of resistive multi-touch screens, wherein present on the transparent functional layer are individual areally conductive segments with conductive patterns which can be individually read out and/or individually contacted. The segments are distinguished in that they are separately electrically contactable.

The individual segments can be of any desired configuration, for example they can also be strip-shaped. Division into segments is preferably also extended in regard to contacting at the connecting electrodes and/or reproduced there so that here too once again suitable division of the connections into segments is effected in relation to multi-touch screens.

In the embodiment of the invention in which contact boosters are also provided in addition to the connecting electrodes, they are also segmented in corresponding multi-touch applications, that is to say for example they are also strip-shaped, so that activation of a segment can also always be read out as an individual, optionally boosted signal.

The surface coverage of the transparent carrier with conductive tracks can vary in a certain range, for example with a surface coverage of 20% the choice of the suitably thin conductor track and the corresponding structure means that it is possible to produce a functional layer which always still appears transparent to the human eye. Preferably the surface coverage is in the range of 3 to 15%, in particular below 10%.

The invention is described in greater detail hereinafter by means of some Figures showing selected embodiments by way of example of the present invention.

FIGS. 1a and 1b show uniform patterns of conductive tracks,

FIGS. 2a and 2b show irregular patterns,

Figure 3:
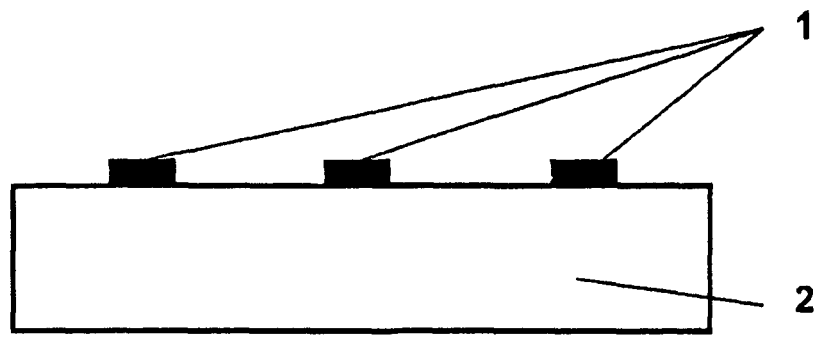
Figure 4:
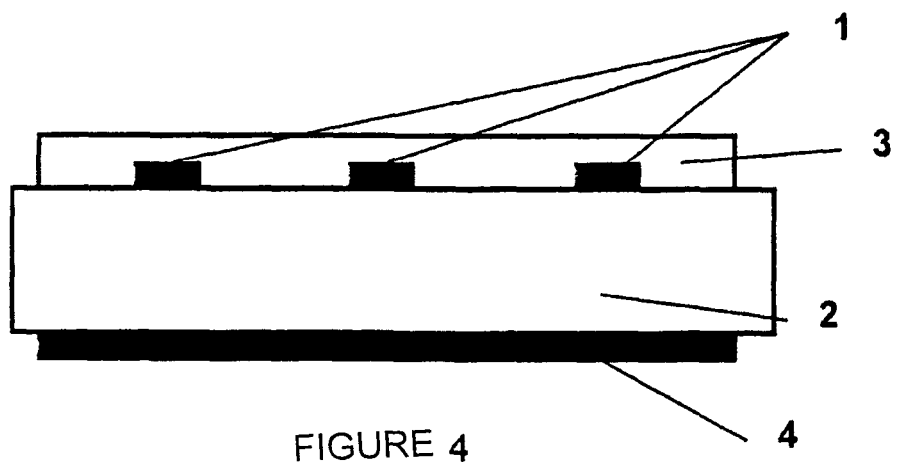
Figure 5:
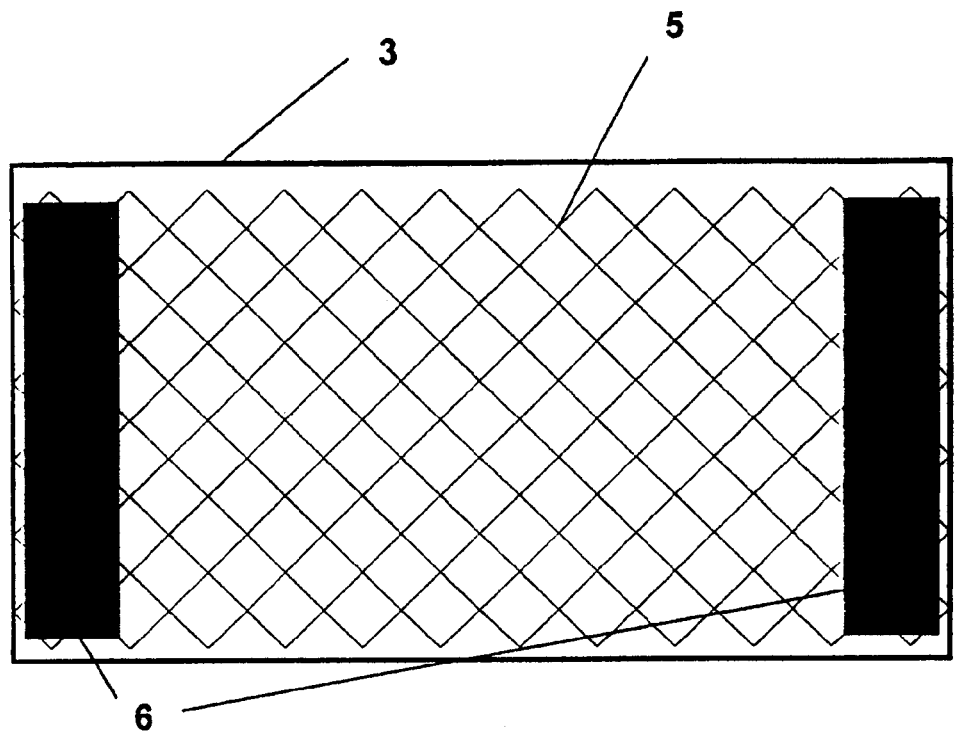
Figure 6:
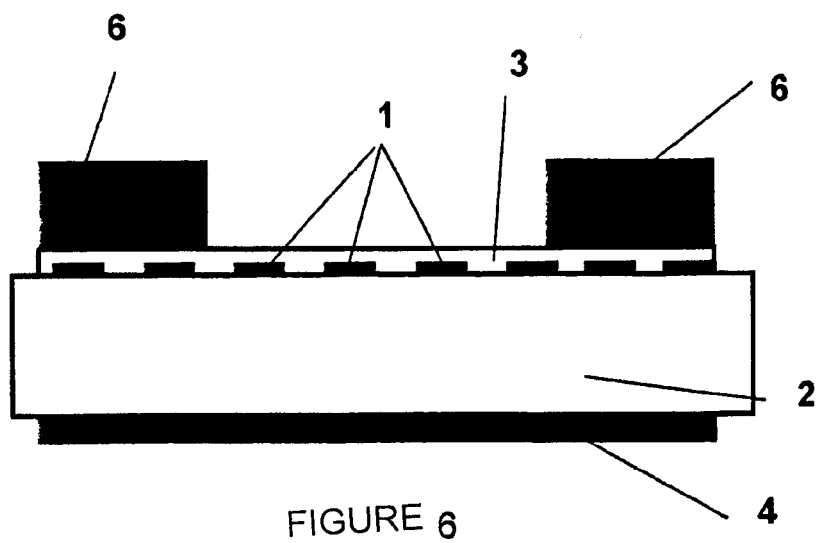
Figure 7:
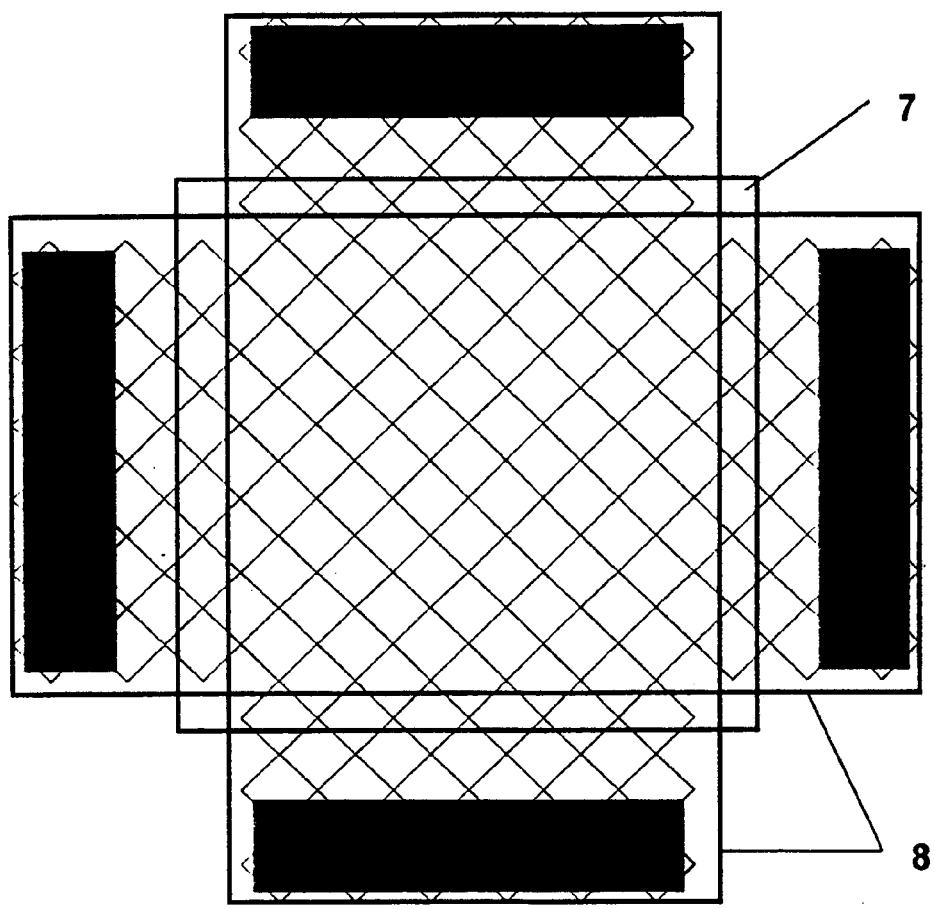
Figure 8:
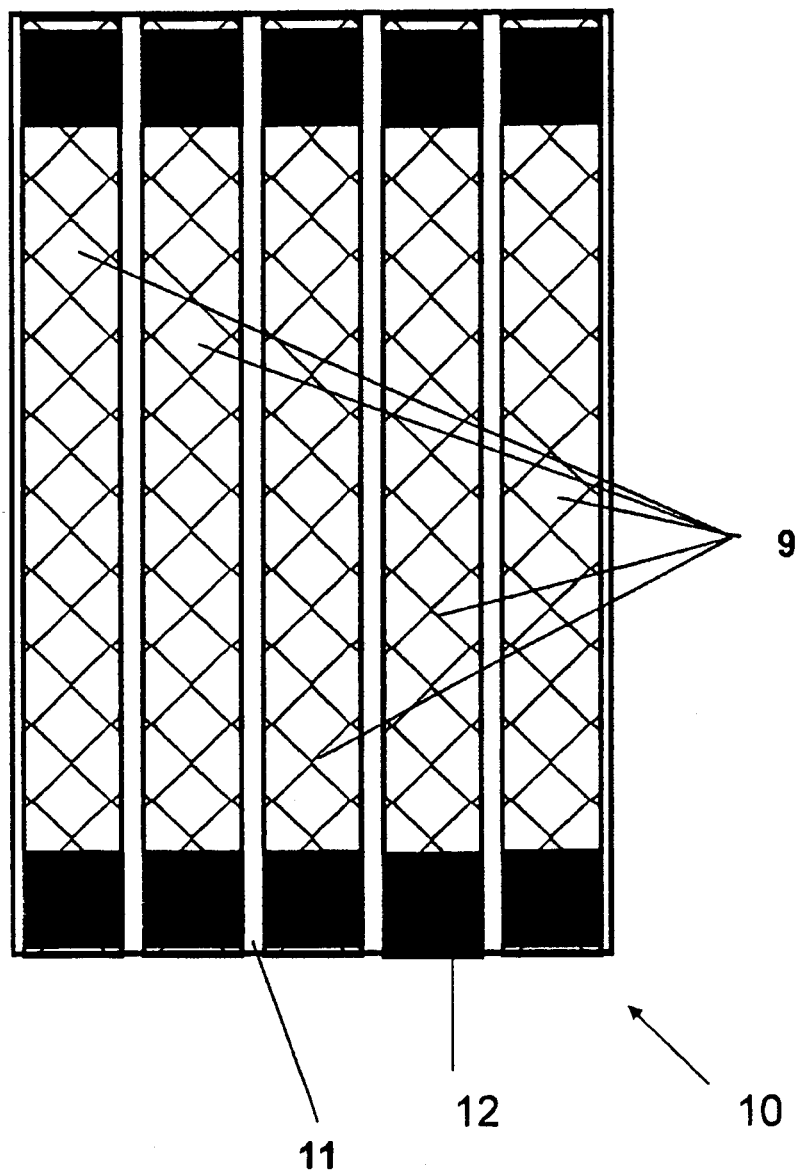
Figure 9:
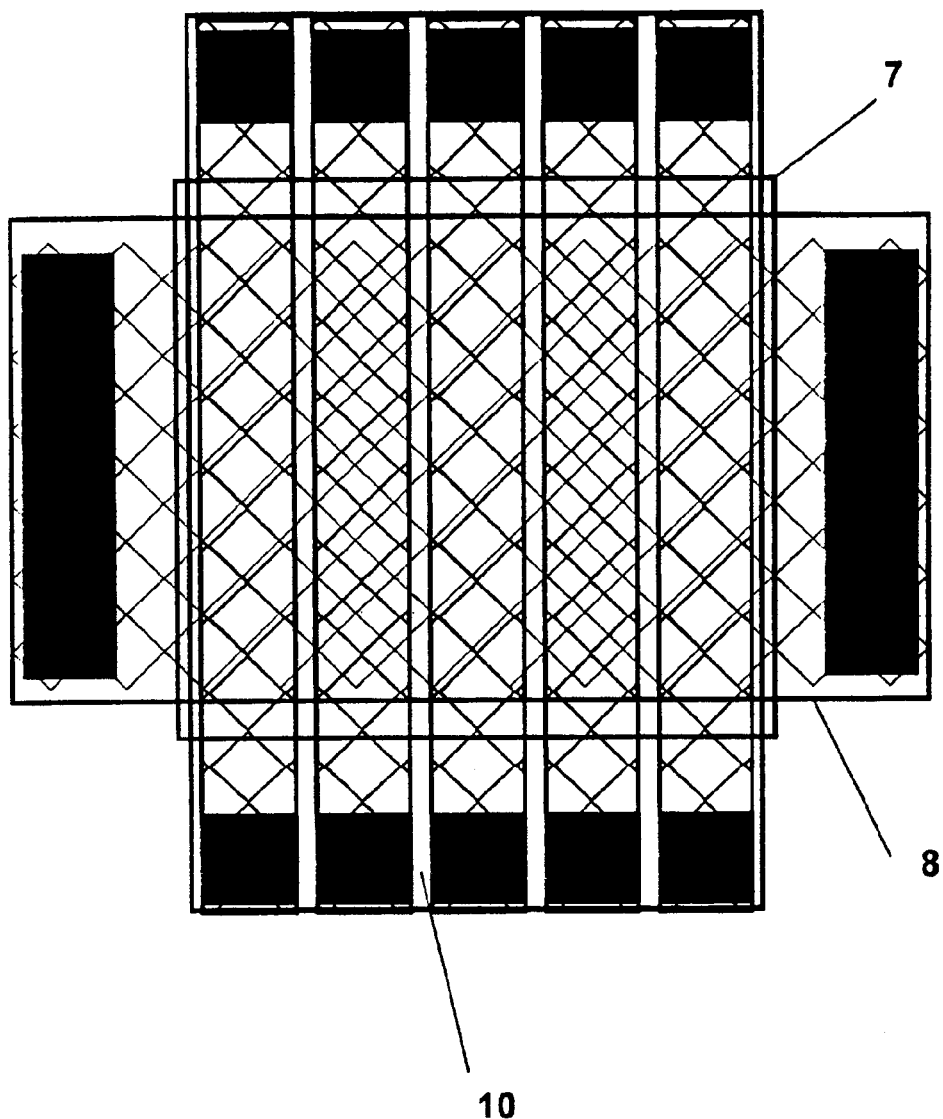
Figure 10:
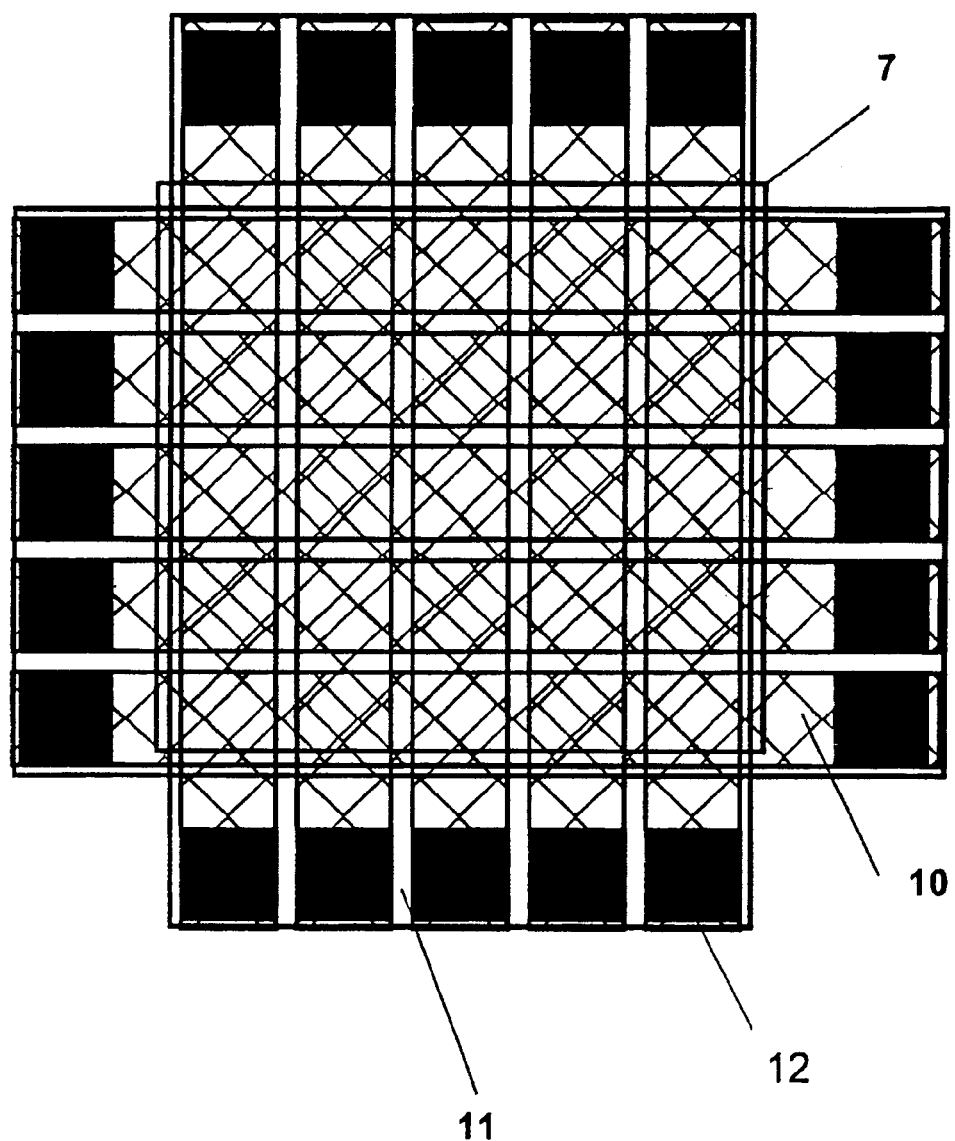
Figure 11:
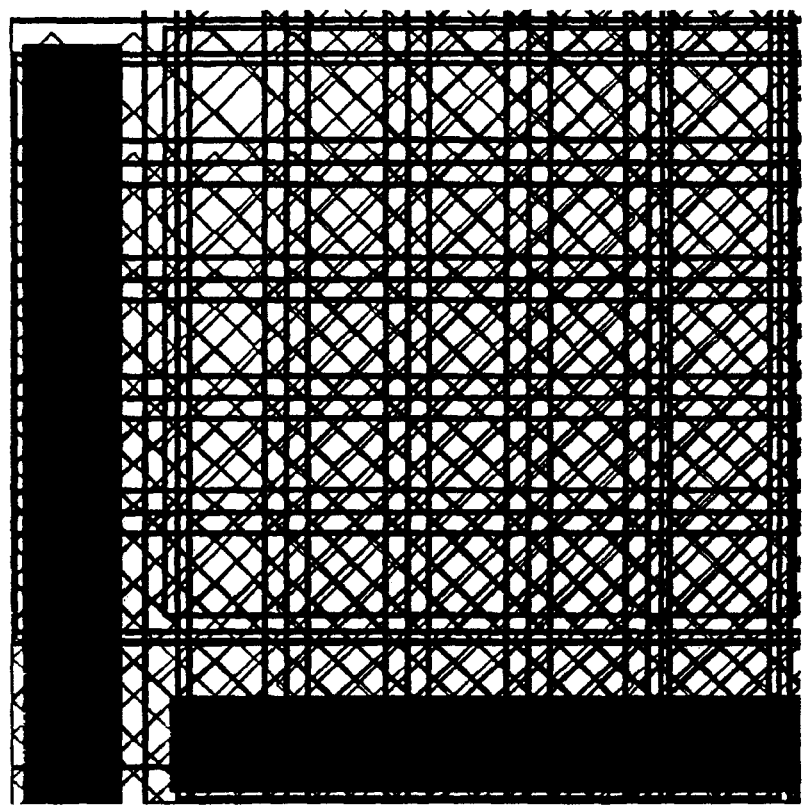

FIG. 3 shows a cross-section of the structure of the electrical functional layer, FIG. 4 shows an electrical functional layer with a plurality of layer portions, FIG. 5 shows an electrical functional layer with connecting electrodes, FIG. 6 shows a cross-section of an electrical functional layer with connecting electrodes, FIG. 7 shows two electrical functional layers as shown in FIG. 5, separated by spacers, FIG. 8 shows an embodiment with segmented conductive regions, FIG. 9 shows a stack of electrical functional layers with segmented conductive regions with different grid configurations, FIG. 10 shows a stack of electrical functional layers with segmented conductive regions with identical grid configurations, and FIG. 11 shows a corner of a film of an electrical functional layer in accordance with the embodiment of FIG. 10 with contact booster.

FIGS. 1a and 1b show examples of patterns of conductive tracks 1 on a transparent carrier (cannot be seen as it is transparent!).

FIGS. 2a and 2b show examples of patterns like FIG. 1, but here, to avoid moiré, none of the electrically conductive tracks is parallel to another.

FIG. 3 shows a cross-sectional view with the transparent substrate 2 which is a transparent film, as is usual for substrates, but it can also be a transparent electrically conductive layer of a suitable thickness. The pattern of conductive tracks 1 is disposed thereon.

FIG. 4 shows the same cross-sectional view as FIG. 3 but besides the conductive tracks 1 and the substrate 2 there is also the transparent thin additional layer 3 which provides areal conductivity in relation to conventional substrates and a further additional layer 4 on the rear side on the substrate 2, which for example is an anti-reflection layer.

FIG. 5 shows how the position of the conductive tracks relative to the connecting electrodes can be so selected that all current paths of the pattern are equally strongly loaded. That involves in particular avoiding conductive tracks being arranged parallel to the connecting electrodes.

In that respect it is advantageous if for example in a rectangular area, in which the connecting electrodes 6 are at two opposite sides, there are no conductor tracks 1 extending parallel to the edges with the connecting electrodes 6 because they then remain practically current-less even in the switched-on condition. Rather in such a situation a simple grid pattern extends as shown here, preferably in such a way that the conductor tracks are arranged at a 45° angle relative to the edges and for example at a 90° angle relative to each other. That gives a diamond pattern for example instead of a checked pattern. With the diamond all current paths in the switched-on condition are then equally loaded and conductivity of a transparent functional layer formed in that way is greater than with the same coverage of a functional layer with a checked pattern extending perpendicularly and horizontally relative to the edges, that is to say also the connecting electrodes 6, because in the latter case only half of the current paths are used.

The current can flow away uniformly from all intersection points 5 with a pattern as shown in FIG. 5.

FIG. 6 shows a cross-section of the embodiment of FIG. 5. It is possible to see here the structure shown in FIG. 4 with conductive tracks 1, substrate 2, conductive additional layer 3 and rear layer 4. It is also possible however to see the connecting electrodes 6 in addition to the view shown in FIG. 4.

FIG. 7 shows a structure comprising two electrical functional layers according to the invention for example for use as a transparent resistive touch area, wherein two functional layers 8, as shown for example in FIG. 5, are laid one upon the other and connected with spacers 7 in such a way that upon pressure being applied a short-circuit occurs, which can be evaluated as a signal. The spacers 7 are also referred to as spacer dots 7.

When the touch screen is touched at a location, the two functional layers come into contact there and either an electrical contact is produced or the resistance is changed. A different voltage occurs at each location due to the resistance of the contact. The change in voltage can then be used to determine the co-ordinates x and y.

FIG. 8 shows a segmented electrical functional layer 10 in which individual electrically conductive segments 9 are arranged at a certain segment spacing 11 relative to each other on a transparent substrate (cannot be seen here as a plan view and the substrate is transparent!). The individual segments 9 have respective contact boosters 12 in relation to the connecting electrodes (not shown here). As shown the individual segments can be separately electrically connected.

To produce those touch screens the individual electrical functional layers can be produced for example on separate substrates. Then in a further process step the top sides are assembled together and/or laminated.

FIG. 9 shows a similar view to FIG. 7, except that one of the two functional layers 8 of FIG. 5 has been replaced by a segmented functional layer 10 as shown in FIG. 8. The second electrical functional layer is a functional layer 8 as shown in FIG. 5 which is not segmented. Here too it is possible to see once again the spacers 7.

FIG. 10 shows a view like FIG. 9 but in this case both functional layers are segmented. The two functional layers are again separated from each other by spacers. All segments can be individually controlled by contact boosters 12.

FIG. 11 finally shows the same configuration as FIG. 10, but with an electrical connection option only at one side.

The ranges specified herein for width of the conductive tracks, spacing of the conductive tracks, segment width and spacing of the segments in multi-touch-capable design configurations can also involve mean values of the totality.

Basically the pattern is so selected that as far as possible all conductor tracks present are loaded as uniformly as possible when a voltage is applied. In the case of patterns forming intersection points the conductive tracks are preferably so placed that the conductive tracks intersect each other in such a way that the current can flow away from the conductor track intersections uniformly in both directions. That is implemented for example in a tilted checked pattern in which the lines are at a 45° angle relative to the connecting electrodes at the edges.

The transparent functional layer is preferably designed with spacer dots in such a way that it can be used in a touch screen. In the case of the resistive touch screens, both or also only one of the two conductive layers can be replaced by the transparent conductive functional layer according to the invention. A combination with a conventional layer of ITO is possible.

The transparent conductive functional layer can be used for example in touch screens. There are different technologies for touch screens, wherein the area of resistive touch screens has a great market share.

Resistive touch screens generally includes two mutually opposite conductive laminate bodies (x-layer and y-layer)—hitherto mostly formed from ITO—which are actuated with a constant dc voltage. Disposed between the laminate bodies are spacers, so-called spacer dots, which ensure separation of the two layers. The spacer dots are generally of a diameter of less than 20 µm, of 0.1 to 5 µm, 0.2 to 2 µm and in particular 0.3 to 0.5 µm.

In the simplest case, for the production of touch screens, the conventional ITO layers are replaced by the transparent conductive functional layer described herein, which is structured to give high resolution, the remaining structure and assembly of the touch screens remains unchanged.

By segmenting the structure and/or the pattern of the transparent conductive functional layer it is possible for the first time for resistive touch screens also to have a multi-touch function, that is to say a plurality of x- and y-positions can be simultaneously detected and read out.

For that purpose a layout is selected, which is subdivided into different segment portions which are respectively extra contacted and can thus be individually read out. In that case the spacing width of the segments can be selected to be different and is preferably selected in conjunction with the grid raster width of the structure.

The present invention however is also suitable for uses like transparent electrodes in solar cells or generally photoactive cells, in organic light emitting diodes (for example also OLED lighting), touch screens, heating arrangements in panes (for example windscreen of a motor vehicle, anti-fogging mirrors etc).

By virtue of the invention disclosed herein it is possible for the first time to produce thin conductive electrical functional layers for use in resistive touch screens for example in a printing process. By way of example the functional layer with a coverage of 5% and adequate conductivity still acts up to 95% transparent for the human eye.

The invention claimed is:

1. An electrical functional layer construction comprising:
a flexible film transparent carrier; and
a plurality of spaced conductive, non-transparent tracks on the carrier exhibiting no parallel straight lines and segmented into individual electrically connectable electrical conductive segments, the tracks having a thickness in the range of 2 nm to 5 µm, and being parallel to the surface of the transparent carrier, forming a pattern;
the pattern having a conductor track spacing which ensures areal conductivity on the film carrier with at the same time transparency to the human eye, wherein the conductive tracks have at least one intersection point.

2. The functional layer construction according to claim 1 comprising two mutually oppositely disposed electrodes.

3. The functional layer construction according to claim 1 including a conductive additional layer partially or over the full surface area for producing areal conductivity or areal conductivity in subregions of the functional layer.

4. The functional layer construction according to claim 1 in which the spacing of the conductive tracks is in the range of 10 µm to 5 mm.

5. The functional layer construction according to claim 1 wherein the individual segments have a width in the range of 500 µm to 15 mm.

6. A process for the production of a functional layer construction comprising: forming a flexible film transparent substrate, producing a plurality of electrically conductive tracks exhibiting no parallel straight lines on the substrate and segmenting the tracks into individual electrically connectable electrical conductive segments, including forming at least one intersection point in the electrically conductive tracks, by at least one of embossing and printing on the transparent substrate by application of a coating and subsequent structuring, the tracks being parallel to the surface of the transparent substrate.

7. The process according to claim 6 which is carried out continuously.

8. The functional layer construction according to claim 1 formed as a resistive touch screen on a transparent pane in at least one of a solar cell, a light emitting diode, a mirror and a display.

9. An electrical functional layer construction comprising:
a transparent flexible carrier;
a pair of spaced electrodes on the carrier; and
a plurality of conductive, non-transparent tracks exhibiting no parallel straight lines and segmented into individual electrically connectable electrical conductive segments, on the carrier electrically conductively connected to and between the electrodes, the tracks being parallel to the surface of the transparent carrier and forming a grid pattern having no conductors parallel to the electrodes and at least one intersection point of the tracks arranged to equally load selected intersected tracks with a current when the current is induced to flow through the selected tracks to and from the electrodes, segmenting the tracks into individual electrically connectable electrical conductive segments;
the pattern exhibiting a conductor track spacing which ensures areal conductivity of the electrical functional layer to and between the electrodes and providing at the same time transparency to the human eye.

10. The electrical functional layer construction of claim 9 wherein the electrodes comprise a pair of linear parallel conductors and the grid pattern is formed by all of the conductor tracks none of which are parallel to the electrodes.

11. The electrical functional layer construction of claim 9 wherein the electrodes are linear and parallel and the grid pattern is formed by conductor tracks that form a diamond grid with respect to and electrically connected to and between the electrodes wherein the conductor tracks are orientated inclined with respect to the orientation of the electrodes.

12. The electrical functional layer construction of claim 11 wherein the tracks are oriented at about 45 degrees with respect to the orientation of the electrodes.

13. The electrical functional layer construction of claim 9 wherein the electrodes are linear and parallel and the grid pattern is formed by conductor tracks that form a grid formed of non-linear conductors electrically conductively connected to and between the respective electrodes wherein the conductor tracks are each orientated inclined with respect to the orientation of the electrodes.

14. The functional layer construction according to claim 12 wherein the conductor tracks are each oriented at a different orientation than the other remaining conductor tracks.

15. The functional layer construction according to claim 9 wherein the individual segments comprise a plurality of adjacent individual electrically connectable segments, each segment comprising:
said pair of spaced electrodes on the carrier; and
said plurality of said conductive, non-transparent tracks on the carrier.

16. The functional layer construction according to claim 1 wherein the pattern of conductor tracks is electrically conductively connected to and between a pair of spaced electrodes.

* * * * *